Patented June 23, 1936

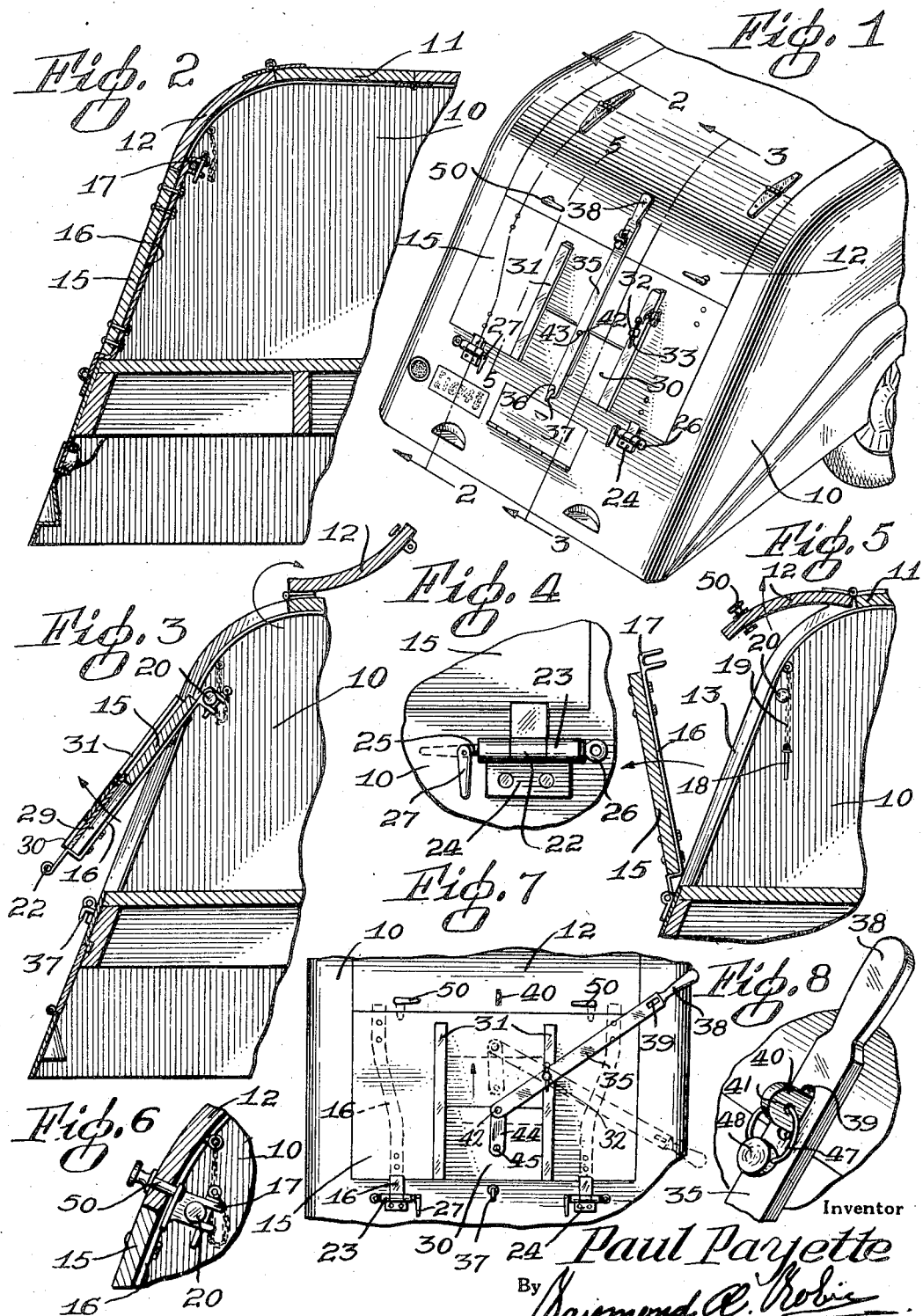

2,045,489

UNITED STATES PATENT OFFICE 2,045,489

ENDGATE FOR VEHICLES

Paul Payette, Outremont, Quebec, Canada

Application November 27, 1935, Serial No. 51,818

3 Claims. (Cl. 296—51)

The present invention relates to improvements in end gate construction for coal trucks and similar vehicles.

An object of the invention is the provision of a vehicle end gate construction of generally improved design.

A further object of the invention is the provision of a vehicle end gate structure embodying means for securely fastening and sealing the end gate in closed position.

Another object of the invention is the provision of a pivotally movable end gate having a fastening bar operable to fasten the gate and also adapted for use as a lever for opening a discharge door on the gate.

A still further object of the invention is the provision of an end gate of the aforesaid character which may be pivotally swung upwardly and downwardly.

Other objects and advantages of the invention will become apparent as the description progresses.

In the accompanying drawing forming a part of this specification and in which like reference characters are employed to designate corresponding parts throughout the same:

Figure 1 is a fragmentary rear perspective view of a motor truck equipped with the improved end gate construction, Figure 2 is a longitudinal section taken on the line 2—2 of Figure 1, Figure 3 is a similar view taken on the line 3—3 of Figure 1, Figure 4 is a fragmentary rear elevation showing one of the gate hinge elements, Figure 5 is a fragmentary longitudinal section showing the gate open on its lower hinges, said section being similar to that of Fig. 2 but taken on line 5—5 of Fig. 1.

Figure 6 is a fragmentary section showing the gate and cover section fastening means, Figure 7 is a rear elevation of the truck and gate showing the fastening element mounted for use as a door opening lever, and Figure 8 is a fragmentary perspective showing the gate sealing connection.

Referring to the drawing, wherein for the purpose of illustration is shown a preferred embodiment of the invention, 10 generally designates a truck body designed for carrying coal or the like having a removable cover structure 11 terminating in a transversely curved cover section 12 at the rear end.

In a slanting back structure of the truck 10 is provided an opening 13 shaped to receive therein a rectangular end gate 15 resting in grooved side channels to fit flush with the curved rear end extension 12 of the body cover. To the inner side of the end gate 15 are secured a pair of vertically extending bars 16 having the upper ends projecting beyond the top edge of the gate and formed to provide U-shaped brackets 17 having the end portions apertured to receive a pin 18 fastened by a chain 19 to the interior of the body. The bracket 17 on the upper end of each of the bars 16 is adapted to be slidably fitted over a grooved rod 20 arranged transversely in the rear end portions of the body to provide a swinging connection.

The lower portion of each bar 16 is offset, as shown at Figure 3, and terminates in a downward extension formed with an eye 22 adapted, in closed position, to assume a position between a pair of fixed eyes 23 mounted on a hinge bracket 24. When the lower hinge structure is connected a pivot pin 25, provided with an enlarged head 26 on one end and with a pivoted keeper element 27 on the opposed end, extends through the aligned hinged eyes 22 and 23.

In the lower portion of the gate is formed a rectangular shaped discharge aperture 29 normally covered by a slidable door 30. The door is guided to slide transversely on the gate between a pair of angular guide bars 31 secured to the exterior side of the gate and mounted to form guide channels. To one of the guide bars 31 is secured an outwardly projecting pivot rod 32 apertured adjacent its outer extremity to receive a removable stop pin 33.

A straight elongated bar 35 is operable to provide means for fastening the gate and door and for sealing the same and is also convertible for use as a lever to elevate the discharge door 30. At the lower end, the bar 35 is formed with an aperture 36 engageable with a curved hook 37 on the body, immediately below the gate. On the upper end, adjacent a handle 38, the bar is provided with a slot 39 to enable the bar to be fitted over a fastening lug 40 provided adjacent its outer end with an aperture 41. At its intermediate portion the bar 35 is formed with an aperture 42 adapted to engage a pin 43 attached to and projecting outwardly from the free end of a link 44 pivotally connected with the door 30 by means of a pivot pin 45.

When a predetermined quantity of coal or other material is placed in the truck body 10 the gate and sliding door 30 may be fastened and sealed by disposing the bar 35 so that the lower aperture 36 engages the body hook 37 while the slot 39 in the upper end portion is fitted over the lug 40. The aperture 42 in the intermediate part of the bar engages the pin 43 on the free end of the link 44 attached to the sliding door so that the door as well as the gate are thus securely held against opening movement. The fastening bar 35 is sealed in position by passing a wire loop 47 through the aperture 41 in the lug 40 and fastening the ends of the loop 47 by a metallic sealing disc 48 which will prevent undetected opening of the truck body.

When it is desired to unload or partially unload the vehicle through the relatively small discharge opening 29 in the gate, the bar 35 is detached from the hook 37 and lug 40 and disposed so that the aperture 42 at the intermediate portion is fitted over the pivot rod 32. The end aperture 36 of the bar is fitted on the pin 43 of the link 44 so that the bar is operable as a lever for raising the door 30, as illustrated at Figure 7.

When, on the other hand, it is desired to unload the vehicle through the gate opening, as for instance by swinging the gate outwardly and downwardly, the bar 35 is removed from its fastening position and the body cover section 12 is swung forwardly. The pins 18 are removed from the pivot brackets 17 so that the upper edge of the gate may be swung in a rearward arc to an open position. To open the gate by swinging the same in the reverse direction, that is upwardly, the hinge pins 25 are slidably removed from the bottom hinge connections and the gate swung about the upper bracket and rod connections to a load releasing position.

When the cover and gate are in fully closed arrangement a pair of rotatable fastener elements 50, mounted on the cover section, are arranged to engage the upper inner part of the gate, as shown at Figure 6, to provide a non-rattling fastener structure.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:—

1. In a coal truck, a body having an end gate mounted at the rear thereof, means hingedly connecting the gate with the body, the said gate having a relatively small discharge aperture formed therein, a door slidably mounted on the gate and operable to close the discharge aperture therein, hooks on the body above and below said gate, and a bar engageable with the hooks of the gate and disposed to extend across the gate and door to releasably fasten the same.

2. In a coal truck, a body having an end gate mounted at the rear thereof, means hingedly connecting the gate with the body, the said gate having a relatively small discharge aperture formed therein, a door slidably mounted on the gate and operable to close the discharge aperture therein, a link pivotally connected to the door, a pivot element secured to the intermediate portion of the gate, hooks disposed on the body above and below the gate, and a bar adapted to be disposed vertically across the gate and door and engage said hooks to fasten the gate and door, the said bar being also operable to fit upon the pivot member and engage the door link to act as a lever for raising the door from a closing to an opening position.

3. In a coal truck, a body having an end gate mounted at the rear thereof, means hingedly connecting the gate with the body, the said gate having a relatively small discharge aperture formed therein, a door slidably mounted on the gate and operable to close the dischage aperture therein, a link pivotally connected to the door, a pivot element secured to the intermediate portion of the gate, a bar adapted to be disposed vertically across the gate and door and engage fastening elements above and below the gate to fasten the gate and door, the said bar being also operable to fit upon the pivot member and engage the door link to act as a lever for raising the door from a closing to an opening position, and means for applying a sealing device to one of the bar engaging fastening elements.

PAUL PAYETTE.